United States Patent [19]

Hasselbring

[11] Patent Number: 4,675,115

[45] Date of Patent: Jun. 23, 1987

[54] METHOD AND DEVICE FOR REMOVING HYDROGEN SULFIDE FROM WELL WATER WITH IN SITU ADSORBENT REGENERATION

[76] Inventor: Wayne C. Hasselbring, R.R. 2, Box 200, Wolcott, Ind. 47995

[21] Appl. No.: 836,721

[22] Filed: Mar. 6, 1986

[51] Int. Cl.⁴ .............................................. C02F 1/28
[52] U.S. Cl. .................................... 210/673; 210/140; 210/180; 210/186; 210/274; 210/290
[58] Field of Search ............... 210/670, 673, 694, 140, 210/184–186, 269, 283, 284, 290, 916, 138, 143, 180, 274

[56] References Cited

U.S. PATENT DOCUMENTS

| | | | |
|---|---|---|---|
| 989,965 | 4/1911 | Harloe | 210/283 |
| 3,448,042 | 6/1969 | Mattia et al. | 210/694 |
| 3,708,068 | 1/1973 | Tischler | 210/140 |
| 3,734,293 | 5/1973 | Biskis | 210/185 |
| 4,264,451 | 4/1981 | Pope et al. | 210/754 |

*Primary Examiner*—Ivars Cintins
*Attorney, Agent, or Firm*—Woodard, Weikart, Emhardt & Naughton

[57] ABSTRACT

A device for removing hydrogen sulfide from well water having in situ activated carbon adsorbent regeneration. The device includes a tank with a water inlet, a water outlet and a steam outlet. The hydrogen sulfide adsorbent material is situated in the tank so that water entering through the water inlet must pass through the adsorbent material before exiting the water outlet. The tank also has a heating element which may be activated to boil water which is in communication with the adsorbent material. The water inlet, the water outlet, and steam outlet each have valves which are operated so that water may enter the tank and pass through the hydrogen sulfide adsorbent material and out the water outlet during water purification stage without any water going out the steam outlet. Additionally, during the regeneration stage, the water outlets and inlets are closed and the steam outlet is opened so that water boiled by the heating element will produce steam which will purge hydrogen sulfide from the hydrogen sulfide adsorbent material and the steam admixed with hydrogen sulfide will be removed from the tank via the steam outlet.

18 Claims, 1 Drawing Figure

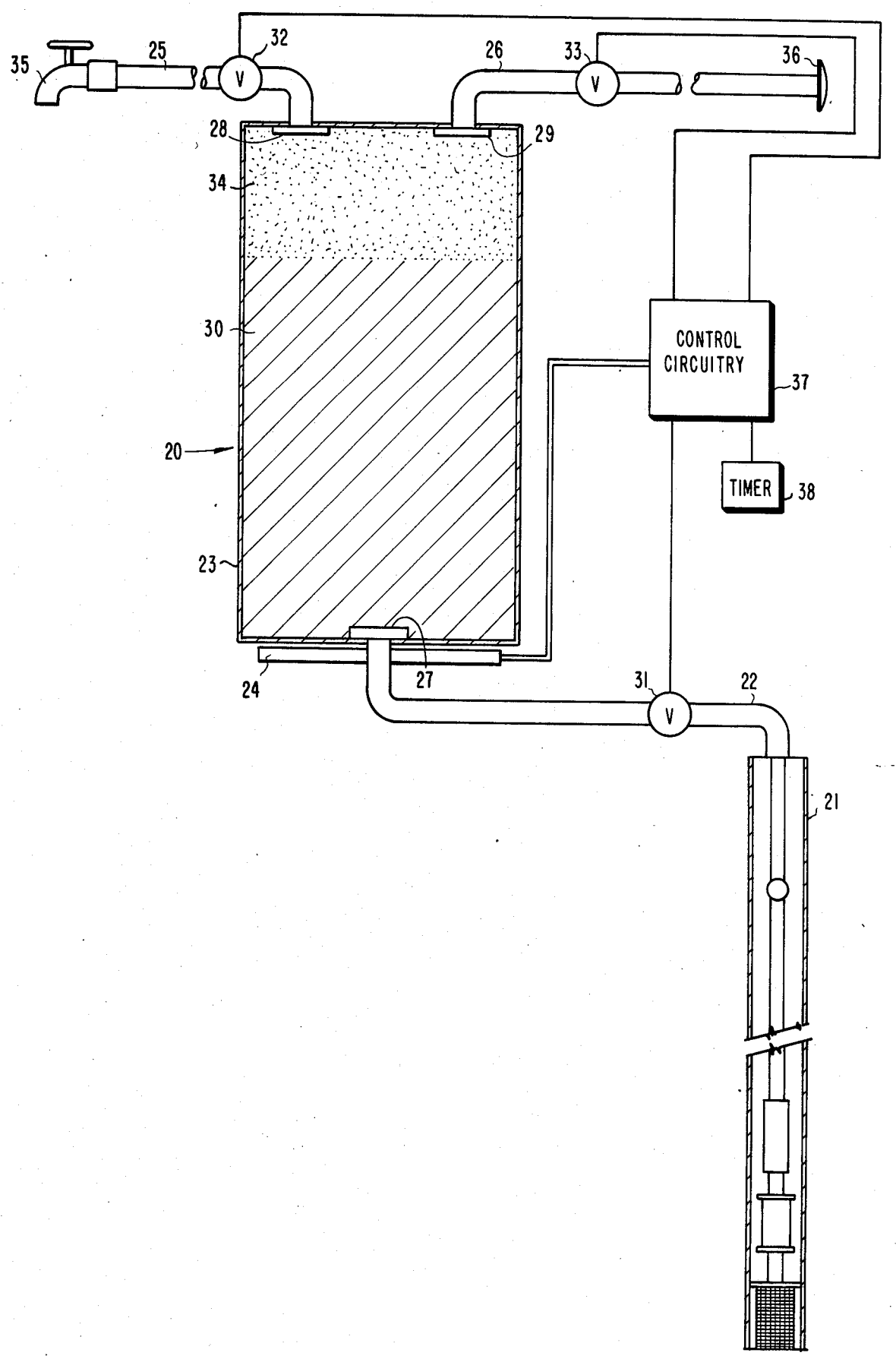

METHOD AND DEVICE FOR REMOVING HYDROGEN SULFIDE FROM WELL WATER WITH IN SITU ADSORBENT REGENERATION

BACKGROUND OF THE INVENTION

This invention relates to a method and device for removing undesirable gases from well water and more particularly to a device and method for removing hydrogen sulfide from well water which incorporates an adsorbent material which may be regenerated in situ.

Well water contains a variety of dissolved gases which tend to give the water a strange taste or odor. Among the main contributors to the strange odor or taste in well water is hydrogen sulfide. Such water is commonly referred to as "sulfur water". The severity of the odor or taste of the water is a function of the concentration of the dissolved gases within the water. Thus, it is apparent that by reducing the concentration of dissolved gases within well water, the severity of the unpleasant taste or odor of the water may be reduced. It is well known that by passing well water through an activated carbon or charcoal filter, that the concentration of undesirable gases and in particular, hydrogen sulfide, may be lowered. One drawback to this method is that the adsorbant ability of the activated carbon or charcoal which is repeatedly exposed to well water is reduced over a period of time. Thus, after a period of time an activated carbon or charcoal filter is no longer able to reduce the concentration of hydrogen sulfide in well water by a sufficient amount to eliminate undesirable tastes or odors from the water. Once this point is reached, it is necessary to either replace the activated carbon or charcoal, or restore its ability to adsorb hydrogen sulfide, i.e. regenerate the activated carbon or charcoal. It has been known for some time that the adsorbent ability of activated carbon or charcoal which has been exposed to hydrogen sulfide may be regenerated by exposing the activated carbon or charcoal to steam at high temperatures.

Various methods and devices for the removal of hydrogen sulfide from water or the regeneration of adsorbent materials are disclosed by the following group of patent references. Each reference pertains in one way or another, to removing hydrogen sulfide from water or the regeneration of adsorbent materials.

| U.S. Pat. No. | Patentee |
|---|---|
| 1,898,688 | Rose |
| 2,181,672 | Sutcliffe et al. |
| 3,192,156 | Joyce |
| 4,045,553 | Mitsumori et al. |

Sutcliffe et. al. (U.S. Pat. No. 2,181,672) discloses an adsorbent filter. Sutcliffe discloses a cylinder containing activated carbon connected to a steam pipe for flushing the carbon after it has become partially or completely charged with a solvent or substance to be recovered. Sutcliffe does not disclose use of activated carbon to remove hydrogen sulfide from well water or the regeneration of the carbon by raising water in the vicinity of the carbon to the boiling point so as to restore the adsorption capabilities of the carbonaceous material.

Rose (U.S. Pat. No. 1,898,688) discloses a method for the purification of battery acid. Rose passes battery acid through activated carbon until the discharge of the battery acid from the activated carbon is no longer of satisfactory purity, at which time the supply of battery acid is stopped and steam is forced through the activated carbon and out the waste pipe so as to drive off the acid previously adsorbed by the carbon. Rose does not disclose the use of activated carbon as a means of removing hydrogen sulfide from well water nor the regeneration of the carbonaceous material in situ by bringing liquid in the vicinity of the material to the boiling point.

Joyce (U.S. Pat. No. 3,192,156) discloses a method for the removal of hydrogen sulfide from water. Joyce passes hydrogen sulfide containing water through a bed of activated carbon impregnated with manganese dioxide to remove the hydrogen sulfide and then through a cationic exchange water softener to remove water soluble manganese and iron compounds. Joyce requires that the activated carbon be impregnated with manganese dioxide in order to attain outstanding hydrogen sulfide removal. Nowhere does Joyce disclose a device or method for regeneration in situ of the activated carbon nor the bringing of water in the vicinity of the activated carbon to the boiling point so as to restore the hydrogen sulfide adsorption capabilities of the activated carbon.

Mitsumori et al. (U.S. Pat. No. 4,045,553) discloses a method of treating silver impregnated activated carbon. Mitsumori restores the spent silver impregnated activated carbon with steam. Mitsumori does not teach or suggest the use of activated carbon for the removal of hydrogen sulfide from water, nor does Mitsumori suggest the attachment of a device to a source of well water. Nowhere does Misumori teach or suggest the regeneration of activated carbon or charcoal by the heating of water in the presence of impregnated activated carbon or charcoal so as to produce steam, and thereby regenerate the activated carbon or charcoal.

None of these prior art references are suitable for use in a home environment to regenerably remove hydrogen sulfide from well water.

SUMMARY OF THE INVENTION

One embodiment of the present invention is a device for removing hydrogen sulfide from well water with in situ adsorbent regeneration comprising a tank substantially filled with a hydrogen sulfide adsorbent material such as activated carbon or charcoal. The tank has a water inlet, a water outlet and a steam outlet. The hydrogen sulfide adsorbent material is situated in the tank so that water entering through the water inlet must pass through the adsorbent material before exiting the water outlet. The tank also has a heating element which may be activated to boil water which is in communication with the hydrogen sulfide adsorbent material. The water inlet, the water outlet, and steam outlet each have valves which are operated so that water may enter the tank through the inlet and pass through the hydrogen sulfide adsorbent material and out the water outlet during water purification stage without any water going out the steam outlet. Additionally, during the regeneration stage, the water outlets and inlets are closed and the steam outlet is opened so that water boiled by the heating element will produce steam which will purge the hydrogen sulfide from the hydrogen sulfide adsorbent material and the steam carrying hydrogen sulfide will be removed from the tank via the steam outlet.

One object of the present invention is to provide a readily regenerable system for removal of undesirable gasses from well water for use in homes having a well water supply.

Another object of the present invention is to provide for the removal of hydrogen sulfide from well water which provides for in situ regeneration of the hydrogen sulfide adsorbent material.

Related objects and advantages of the present invention will be apparent from the following description.

BRIEF DESCRIPTION OF THE DRAWING

The FIGURE is a side elevation partial cross-sectional view of a device for the removal of hydrogen sulfide with in situ adsorbent regeneration.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the FIGURE, there is illustrated a device 20 for the removal of hydrogen sulfide from well water with in situ adsorbent regeneration. The device 20 includes a below ground well 21 for providing the water which contains hydrogen sulfide, a well water supply line 22, a tank 23, a heating element 24, purified water line 25 and a steam line 26.

The tank 23 has an inlet 27, a water outlet 28 and a purge outlet 29. Exposed within the tank is a hydrogen sulfide adsorbent material 30. Inlet 27 may be opened or closed to control the flow of water into the tank by means of valve 31. Water outlet 28 may be opened or closed to provide for purified water to flow out of the tank by means of valve 32. Purge outlet 29 may be opened or closed to control the exit of steam by means of valve 33.

The tank 23 may be designed differently from that shown in the FIGURE, but water tight integrity is needed. The type of tank or liquid container chosen will depend in part upon the type of heating element 24 employed to boil the water within the tank. Irrespective of the heating element 24, the tank's water tight integrity must not be affected by temperature differentials resulting from the heating of water within the tank.

The heating element 24 may be any type of heating element capable of raising the temperature of the water within the tank to the boiling point. One such heating element would be a typical 220 volt, 2100 watt burner which may be placed on the exterior of the tank. With the use of such a burner a thermoconductive tank would be used in order to transfer the heat from the burner to the water within the tank. It is also envisioned that the heating element 24 may be disposed within the tank so as to directly heat water within the tank rather than transferring the heat through the tank to the water. Additionally it is envisioned that, in homes with natural or LP gas or fuel oil, a gas burner or fuel oil burner may be employed to raise the water to the boiling point. In such a situation, the tank again must be thermoconductive. With the use of an internal heating element 24 the tank 23 may be of thermoresistant construction so as to minimize energy losses in the heating of the water. Although not illustrated, it is envisioned that the tank may be appropriately thermally insulated so as to increase energy efficiency and reduce energy costs.

The adsorbent material 30 will now be more particularly described. The adsorbent material 30 is disposed in the fluid path between the inlet 27 and the water outlet 28. Additionally the adsorbent material 30 is disposed so that heated water and steam generated thereby must flow through the adsorbent material in order to be evacuated from the system through the purge outlet 29. The adsorbent material 30 may be any of a group of well known materials which are capable of adsorbing hydrogen sulfide from water and also capable of having adsorbed hydrogen sulfide purged from the material by means of steam or water heated to the boiling point. In one embodiment, a carbonaceous adsorbent material is employed. Among some of the better known carbonaceous adsorbent materials are charcoal and activated carbon, any material capable of meeting the criteria described may be used.

Additionally disposed within the tank is a layer of filtering material 34. Filtering material 34 is disposed in the fluid path between the adsorbent material 30 and the water outlet 28 and the purge outlet 29. This filter material prevents small particles of the adsorbent material from passing through water outlet 28 and purge outlet 29 and into purified water supply line 25 and steam outlet line 26. One material that has proven effective in serving this function is sand. In one embodiment of this device the tank is filled three-fourths full with adsorbent material and one-fourth full with sand. Of course it is envisioned that any material capable of serving this filtration function may be used and is within the scope of this invention.

The operation of device 20 will now be more particularly described and in so doing a method for removal of hydrogen sulfide from well water with in situ adsorbent regeneration will be made clear.

The device 20 has basically two stages, the first being a hydrogen sulfide removal stage, and the second being an adsorbent material regeneration stage. In the hydrogen sulfide removal stage, well water containing hydrogen sulfide is pumped from well 21 through well water supply line 22 and into the tank 23 through inlet 27. This occurs because during the hydrogen sulfide removal stage valve 31 is open to permit the flow of water. The well water containing hydrogen sulfide upon entering the tank percolates through adsorbent material 30. During this percolation, hydrogen sulfide in the well water is adsorbed by the adsorbent material 30. The water then passes through filtering material 34 so that minute particles of the adsorbent material 30 which are carried by the water are filtered out of the water. After passing through filtering material 34 the water, with its concentration of hydrogen sulfide reduced, passes out of the tank through water outlet 28 then through the purified water supply line 25 to a home water using fixture 35, illustrated as a faucet, but which may be any such device such as a dishwasher, clothes washer, shower, ice maker, drinking fountain, sink, bathtub, etc. During the hydrogen sulfide removal stage, valve 32 is open to permit the water to flow out of the tank and through the purified water supply line 25. Also during this stage valve 33 is closed so as to prevent water from flowing through steam outlet line 26 from purge outlet 29.

It is well known that the adsorbent capabilities of adsorbent material is reduced as a function of both the quantity of water passed through the adsorbent material 30 and the concentration of hydrogen sulfide contained in such water. Therefore, in time the ability of the adsorbent material to adsorb hydrogen sulfide from well water is significantly reduced. In order to regenerate adsorbent capabilities of the adsorbent material 30, it is necessary to purge the previously adsorbed hydrogen sulfide from the material. This occurs during the regeneration stage.

In the regeneration stage valve 31 is closed so that water remains within the tank 23. Heating element 24 is energized to heat the water within the tank to the boiling point. Prior to the water within the tank 23 reaching the boiling point, valve 32 is closed and valve 33 is opened. This is done so that steam and hydrogen sulfide escaping the water will not enter the purified water supply line 25, but instead will escape through purge outlet 29 and into steam outlet line 26. Should valve 32 not be closed before the water within the tank is brought to the boiling point, the steam produced by the water could enter the purified water supply line and hydrogen sulfide carried by the steam might be deposited in the line and the effectiveness of the device would be greatly reduced.

The the hot water and steam passing through the adsorbent material purges the adsorbent material and the steam carries away hydrogen sulfide previously adsorbed by the adsorbent material 30. This steam and hydrogen sulfide then exit tank 23 through purge outlet 29, pass through steam outlet line 26 and are vented at vent 36.

In order to restore the adsorbent qualities of the adsorbent material 30, it is necessary to boil the water within the tank for a sufficient time to allow for the hydrogen sulfide to be purged. In one embodiment of this device it has been found that one hour of heat time is required to bring the water to the boiling point and then two hours of boiling time is sufficient to restore the adsorbent qualities of the adsorbent material 30. However, the amount of heating and boiling time will vary in accordance to the type of heating element 24 and type of tank 23 employed. It is envisioned that a safety valve (not illustrated) may also be added to the tank as a pressure release mechanism should valve 33 fail to open or purge outlet 29 or steam outlet line 26 become clogged for any reason.

In order to allow for automatic regeneration of device 20, circuitry 37 of conventional design is used for controlling valves 31, 32 and 33 and enabling heating element 24. This control circuitry 37 uses a timer 38 to automatically set the times for regeneration of the adsorbent material at a time when there will be a low demand for water such as in the early hours of the morning. This type of circuitry is commonly used in water softener devices. The circuitry should be of the type that would automatically regenerate no more frequently than once per day.

An example of the method of removing hydrogen sulfide from well water is as follows. Well water is passed through the activated carbon in the purification stage reducing the concentration of hydrogen sulfide in the well water which is thereafter flows to the home water using fixture 35. Repeatedly, for example at 3:00 A.M. every other day, the adsorbent is regenerated by interrupting the purification stage and entering into a purge stage which includes heating water in the tank 23 to cause it to boil, venting the vapors from the boiling water out of vent 36 (thus reducing the amount of hydrogen sulfide on the adsorbent), thereafter ceasing said heating and venting and resuming the purification stage.

While there has been described above the principles of this invention in connection with a specific device and method, it is to be clearly understood that this description is made only by way of example and not as a limitation to the scope of the invention.

What is claimed is:

1. A method for removing hydrogen sulfide from well water with in situ adsorbent regeneration comprising the steps of:
   passing well water through a hydrogen sulfide adsorbent in a container whereby the concentration of hydrogen sulfide in the well water is reduced; and
   repeatedly regenerating said adsorbent by repeatedly:
   interrupting said passing,
   heating water in the container to cause it to boil and venting the vapors from the boiling water, whereby the amount of hydrogen sulfide on the adsorbent is reduced; and
   thereafter ceasing said heating and venting and resuming said passing.

2. The method for removing hydrogen sulfide from well water with in situ adsorbent regeneration of claim 1 wherein said repeatedly regenerating step is performed not more frequently than once per day.

3. The method for removing hydrogen sulfide from well water with in situ adsorbent regeneration of claim 2 wherein said passing step includes the step of passing said well water through activated carbon.

4. The method for removing hydrogen sulfide from well water with in situ adsorbent regeneration of claim 1 wherein said passing step includes the step of passing said well water through activated carbon.

5. A device for removing hydrogen sulfide from well water, having in situ adsorbent regeneration means comprising:
   a liquid container, having an inlet, a water outlet and a purge outlet;
   inlet means for connecting the inlet of said container to a source of well water containing hydrogen sulfide;
   carbonaceous adsorbent material in said container;
   heating means which can be enabled for heating water within said container to generate steam; and
   condition provision means for providing a first condition allowing water to flow from said inlet through said adsorbent material to said water outlet and closing said purge outlet, and for providing a second condition enabling said heating means and opening said purge outlet and closing said inlet and water outlet.

6. The device of claim 5 wherein said condition provision means includes a timing means for automatically providing said second condition not more frequently than once per day.

7. The device of claim 6 wherein said carbonaceous adsorbent material is activated carbon.

8. The device of claim 7 which further comprises a layer of sand fluidly interposed in the fluid path between said carbonaceous adsorbent material and said water outlet to prevent said carbonaceous adsorbent material from entering said water outlet.

9. The device of claim 8 which further comprises a source of well water connected to said inlet means.

10. The device of claim 5 which further comprises a source of well water connected to said inlet means.

11. The device of claim 5 wherein said carbonaceous adsorbent material is activated carbon.

12. A device for removing hydrogen sulfide from well water, having in situ adsorbent regeneration means comprising:
   a source of well water containing hydrogen sulfide
   a liquid container, having an inlet, a water outlet and a purge outlet;
   inlet means connecting the inlet of said container to said source of well water containing hydrogen sulfide;
   carbonaceous adsorbent material in said container;
   steam production means which can be enabled for providing steam within said container; and
   condition provision means for providing a first condition allowing water to flow from said inlet through said adsorbent material to said water outlet and closing said purge outlet, and for providing a second condition enabling said steam production means and opening said purge outlet and closing said inlet and water outlet.

13. The device of claim 12 wherein said condition provision means includes a timing means for automatically providing said first condition and said second condition not more regularly than once per day.

14. The device of claim 12 wherein said steam production means includes a heating means for heating water within said container to generate steam when said steam production means is engaged.

15. The device of claim 14 wherein said carbonaceous adsorbent material is activated carbon.

16. The device of claim 15 which further comprises a layer of sand fluidly interposed between said carbonaceous adsorbent material and said water outlet to prevent said carbonaceous adsorbent material from entering said water outlet.

17. The device of claim 12 wherein said carbonaceous adsorbent material is activated carbon.

18. The device of claim 17 which further comprises a layer of sand fluidly interposed between said carbonaceous adsorbent material and said water outlet to prevent said carbonaceous adsorbent material from entering said water outlet.

* * * * *